(12) United States Patent
Parkar et al.

(10) Patent No.: US 12,512,998 B2
(45) Date of Patent: Dec. 30, 2025

(54) SYSTEM AND METHOD FOR STORING AND VALIDATING CREDENTIALS TO ACCESS A RESTRICTED AREA

(71) Applicant: SPINTLY INC., Milpitas, CA (US)

(72) Inventors: Rohin Parkar, Ponda (IN); Brosnan Gomes, Margao (IN); Marc Miranda, Panaji (IN); Malcolm Dsouza, Margao (IN)

(73) Assignee: SPINTLY INC., Milpitas, CA (US)

( * ) Notice: Subject to any disclaimer, the term of this patent is extended or adjusted under 35 U.S.C. 154(b) by 0 days.

(21) Appl. No.: 18/037,846

(22) PCT Filed: Nov. 19, 2021

(86) PCT No.: PCT/IN2021/051085
§ 371 (c)(1),
(2) Date: May 19, 2023

(87) PCT Pub. No.: WO2022/107171
PCT Pub. Date: May 27, 2022

(65) Prior Publication Data
US 2024/0015022 A1 Jan. 11, 2024

(51) Int. Cl.
*H04L 9/32* (2006.01)
*H04B 5/72* (2024.01)
*H04L 9/08* (2006.01)

(52) U.S. Cl.
CPC ............ *H04L 9/3234* (2013.01); *H04B 5/72* (2024.01); *H04L 9/0819* (2013.01); *H04L 2209/805* (2013.01)

(58) Field of Classification Search
CPC ............... H04L 9/3234; H04L 9/0819; H04L 2209/805; H04L 9/083; H04L 9/32; H04B 5/72
USPC .......................................................... 713/168
See application file for complete search history.

(56) References Cited

U.S. PATENT DOCUMENTS

| 2014/0361872 | A1* | 12/2014 | Garcia ................. H04B 5/20 340/5.74 |
| 2015/0208245 | A1 | 7/2015 | Robinton et al. |
| 2019/0052468 | A1* | 2/2019 | Ngoc-Ai Lu ........... H04L 9/008 |

(Continued)

FOREIGN PATENT DOCUMENTS

CN 106031087 A 10/2016

*Primary Examiner* — Bryan F Wright
(74) *Attorney, Agent, or Firm* — Jose Cherson Weissbrot

(57) ABSTRACT

A system (100) for storing and validating credentials comprising: access devices (104) wirelessly coupled to one another, wherein the access devices (104) comprises memories (122) such that the memories (122) are configured to store user credential information derived from a unique user identifier associated with each user registered to the access device; a server (108) coupled to the access devices (104), and configured to: store a mapping between base keys and unique serial numbers associated with Near Field Communication (NFC) tags (106); and provide each base key to each access device when each access device is registered with the system (100), wherein an access is granted to a NFC tag based on (i) an identification and fetching of the user credential information from a memory of an access device based on the unique user identifier and (ii) an authentication of a base key associated with the NFC tag.

19 Claims, 4 Drawing Sheets

(56) References Cited

U.S. PATENT DOCUMENTS

2019/0096177 A1* 3/2019 Sepich ............... G07F 17/3244
2020/0266975 A1* 8/2020 Guidi ................ G06K 7/10257

* cited by examiner

SYSTEM AND METHOD FOR STORING AND VALIDATING CREDENTIALS TO ACCESS A RESTRICTED AREA

RELATED FIELD

The present disclosure relates to a field of credentials validation. More particularly, the present disclosure relates to provide a method to store and update credentials on a physical access point reader and Near Field Communication (NFC) tag using wireless mesh networks.

BACKGROUND

In computer networks, an access point is a device that creates a wireless local area network, or WLAN, usually in an office or large building. An access point connects to a wired router, switch, or hub via an Ethernet cable, and projects a Wi-Fi signal to a designated area. System access control is a security technique that regulates who or what can view or use resources in a computing environment. It is a fundamental concept in security that minimizes risk to the business or organization. Prevalent access control systems consist of access point readers and a mechanism to lock or unlock an access barrier to a restricted area with help of electro-magnetic locks, door locks etc. An authorized user can gain access to the restricted area using a valid NFC tag or a smart phone application. To authorize the access, the credentials are verified by the access point reader when provided with a unique user identifier from the NFC tag or from the smart phone application. The unique user identifiers are stored in the NFC tag at a personalization stage and the smart phone application retrieves its unique identifier from cloud for the particular access point reader. Further, the credentials need to be stored in a secure manner on the device to avoid any misuse. For this, usually the credentials are encrypted in the storage device and also during retrieval for accessing.

Current technologies primarily use wired systems to establish communications between the access point readers and a central control system which stores the credentials for all access point readers. The readers read the user data from the NFC tag or a smart phone application and send it to the central controller for facilitating access grant decision.

The current technologies suffer from multiple drawbacks such as a need for a wired implementation involving huge cost, labour, and requirement of time. Also, if a central controller malfunctions or stops working then all the restricted areas will remain locked as majority of access decisions are taken by the controller.

Therefore, there is a need for a solution that provides a system and method that enables to overcome the above-mentioned limitations.

SUMMARY

In an aspect of the present disclosure a system for storing and validating credentials is provided. The system comprising: a plurality of access devices wirelessly coupled to one another. The plurality of access devices comprises a plurality of memories such that each memory of the plurality of memories is configured to store user credential information derived from a unique user identifier associated with each user registered to the access device. The system further includes a server coupled to the plurality of access devices (104), and configured to: store a mapping between a plurality of base keys and a plurality of unique serial numbers associated with a plurality of Near Field Communication (NFC) tags. The server is further configured to provide each base key of the plurality of base keys to each access device of the plurality of access devices when each access device of the plurality of access devices is registered with the system. An access is granted to a NFC tag of the plurality of NFC tags based on (i) an identification and fetching of the user credential information from a memory of an access device of the plurality of access devices based on the unique user identifier and (ii) an authentication of a base key of the plurality of base keys associated with the NFC tag.

In some aspects, the plurality of NFC tags enables a user to access a restricted area, wherein (i) the plurality of NFC tags has the plurality of associated base keys and the plurality of associated unique serial numbers and (ii) each NFC tag of the plurality of NFC tags is enrolled with the system by way of enrolment at an access device of the plurality of access devices.

In some aspects, the unique user identifier facilitates to determine a bucket associated to the memory of the access device of the plurality of access devices where the user credential information is stored.

In some aspects of the present disclosure, the system further comprising a user device such that each NFC tag of the plurality of NFC tags is enrolled with the system by way of enrolment at the user device.

In some aspects of the present disclosure, each NFC tag of the plurality of NFC tags is enrolled with a credential ID (CID). The CID associated with each NFC tag of the plurality of NFC tags is encoded with a unique encryption key such that the unique encryption key associated with each NFC tag of the plurality of NFC tags is written to each NFC tag of the plurality of NFC tags.

In some aspects of the present disclosure, to read the CID associated with each NFC tag of the plurality of NFC tags, each access device of the plurality of access devices is configured to utilizes a key diversification technique that involves matching the base key and a unique serial number associated with each NFC tag of the plurality of NFC tags.

In some aspects of the present disclosure, the user device is further configured to fetch the base key associated with a NFC tag of the plurality of NFC tags from the server to read and/or write the NFC tag of the plurality of NFC tags.

In some aspects of the present disclosure, to read the CID associated with each NFC tag of the plurality of NFC tags, the user device is configured to utilizes a key diversification technique that involves matching the base key and a unique serial number associated with each NFC tag of the plurality of NFC tags.

In some aspects of the present disclosure, each access device of the plurality of access devices is further configured to store the CID associated with each NFC tag of the plurality of NFC tags when each NFC tag of the plurality of NFC tags is enrolled with the system.

In some aspects of the present disclosure, each access device of the plurality of access devices is further configured to transmit the CID associated with each NFC tag of the plurality of NFC tags to the server over the communication network.

In some aspects of the present disclosure, each access device of the plurality of access devices is further configured to fetch and match the stored CID of each NFC of the plurality of NFC tags when the NFC tag registered with the system is within a predefined proximity range to grant access to the user with the NFC tag having matching CID.

In some aspects of the present disclosure, the predefined proximity range is from 1 meter to 100 meters.

In another aspect of the present disclosure a method for storing and validating credentials is disclosed. The method comprising: enrolling, by one of, a user device and an access device of a plurality of access devices, each Near Field Communication (NFC) tag of a plurality of NFC tags by using a credential ID (CID). Storing, by an access device of the plurality of access devices, user credential information derived from a unique user identifier associated with each user registered to the access device storing, by a server, a mapping between the plurality of base keys and the plurality of unique serial numbers associated with the plurality of NFC tags. Reading, by the access device of the plurality of access devices, the CID associated with each NFC tag of the plurality of NFC tags, wherein each access device of the plurality of access devices is configured to utilizes a key diversification technique that involves matching the base key and a unique serial number associated with each NFC tag of the plurality of NFC tags. Providing, by the server, the plurality of base keys to each access device of the plurality of access devices when each access device of the plurality of access devices is registered with the system. An access is granted to a NFC tag of the plurality of NFC tags based on (i) an identification and fetching of the user credential information from a memory of an access device of the plurality of access devices based on the unique user identifier and (ii) an authentication of a base key of the plurality of base keys associated with the NFC tag.

BRIEF DESCRIPTION OF THE DRAWINGS

Other objects, features, and advantages of the aspect will be apparent from the following description when read with reference to the accompanying drawings. In the drawings, wherein like reference numerals denote corresponding parts throughout the several views.

The diagrams are for illustration only, which thus is not a limitation of the present disclosure, and wherein.

To facilitate understanding, like reference numerals have been used, where possible to designate like elements common to the figures.

DETAILED DESCRIPTION OF THE PREFERRED ASPECTS

Figure 1A:
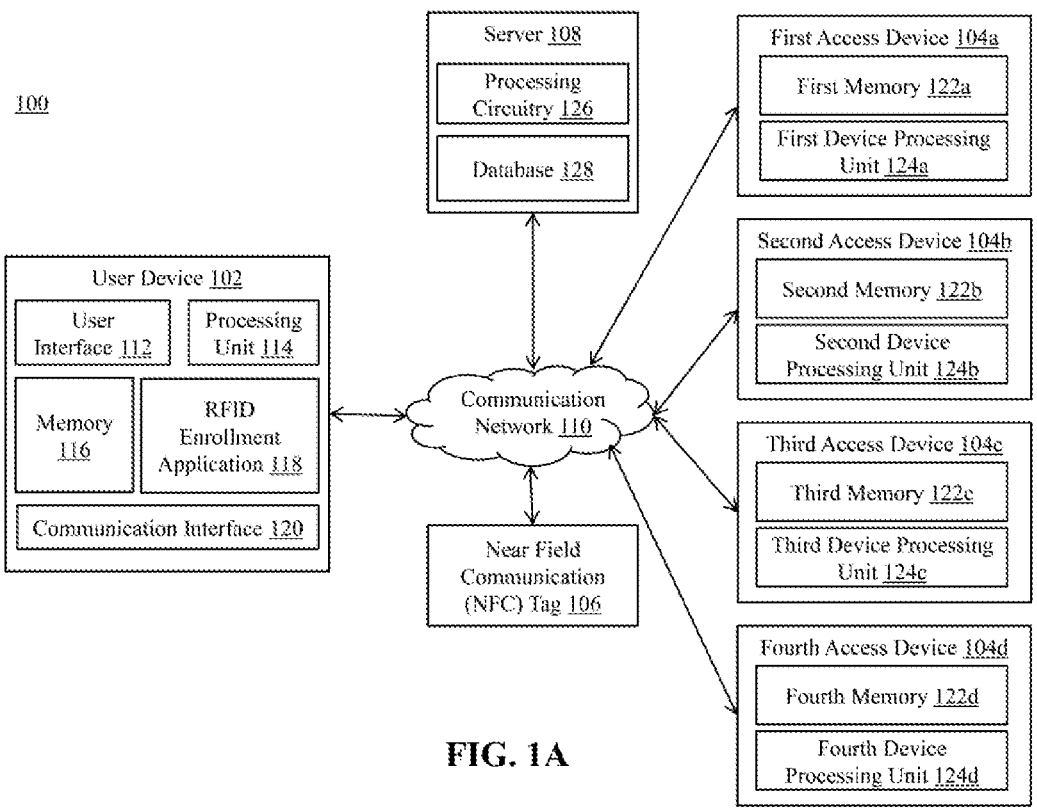
FIG. 1A is a block diagram that illustrates a system for storing and updating credentials on physical access devices using a wireless mesh network, in accordance with an aspect of the present disclosure.

The aspects herein and the various features and advantageous details thereof are explained more fully with reference to the non-limiting aspects that are illustrated in the accompanying drawings and detailed in the following description. Descriptions of well-known components and processing techniques are omitted so as to not unnecessarily obscure the aspects herein. The examples used herein are intended merely to facilitate an understanding of ways in which the aspects herein may be practiced and to further enable those of skill in the art to practice the aspects herein. Accordingly, the examples should not be construed as limiting the scope of the aspects herein.

Definitions

"Bluetooth low energy" (BLE) is a wireless personal area network that consumes less energy than bluetooth and possess larger area than bluetooth. Beacon is a hardware transmitter, which transmits BLE signal on its proximity.

The term "Bluetooth low energy" and "BLE" and such other term defines Bluetooth low energy and interchangeably used across the context.

"Gateway" is a software, or a hardware used in telecommunications for computer networks that allows data to flow from one discrete network to another. Gateway controls the flow of data packets across the network.

The term "gateway", "hub" and "controller" and other such term defines gateway and interchangeably used across the context.

First through fourth access devices coupled to one another over a BLE mesh network "Data packets" is a unit of data made into a single package that travels along a given network path. Data packets are used in Internet Protocol (IP) transmissions for data that navigates the Web, and in other kinds of networks.

"Cloud" refers to servers that are accessed over the internet, and the software and databases that run on said servers. The cloud enables users to access the same files and applications from any device due to the computing and storage occurs on the servers in a data centre, instead of locally on the user device.

The term "cloud" may be used "central database" and other such term defines cloud and interchangeably used across the context.

Reader refers to the devices/virtual device that reads and authenticate data and sends the data to gateway for authentication.

The term "reader" and "scanner device" and other such term defines reader and interchangeably used across the context.

As mentioned, there remains a need for system and method that exists with a Bluetooth Low Energy (BLE) mesh topology (a subset of a wireless mesh topology) that can provide a wireless mesh network where credentials are stored and validated on a cloud database.

The present disclosure relates to wireless access control systems where all the devices in the network communicate over Bluetooth Low Energy (BLE) mesh protocol unlike the earlier available systems which used wired interfaces like Wiegand, RS485 and so forth since the devices are unsupervised and unstable for longer execution. The wireless mesh allows devices to relay messages to the intended device over 2.45 GHz wireless frequencies.

Referring initially to the drawings, FIG. 1A is a block diagram that illustrates a system 100 for storing and updating credentials on physical access devices using a wireless mesh network. The system 100 may be a credential based access control system that can be configured to store and update credentials on the physical access devices for efficient memory utilization and fast access response speeds for a large user database using a wireless mesh network such as but not limited to, a Bluetooth Low Energy (BLE) Mesh, a Zigbee mesh, threads, and so forth. The system 100 may be further configured to enable remote enrollment and assignment of Near Field Communication (NFC) tags using the physical access devices. As illustrated in FIG. 1A, the system 100 may comprise a user device 102, a plurality of access devices 104 of which first through fourth access devices 104a-104d are shown, a Near Field Communication (NFC) tag 106, and a server 108. In the illustrated aspect of FIG. 1A, the user device 102, the first through fourth access devices 104a-104d, the NFC tag 106, and the server 108 are communicatively coupled to each other via a communication network 110. In other aspects, the user device 102, the first through fourth access devices 104a-104d, the Radio NFC tag 106, and the server 108 can be communicably coupled through separate communication networks established therebetween.

The user device 102 may be capable of facilitating a user to input data, receive data, and/or transmit data within the system 100. It will be apparent to a person of ordinary skill in the art that the user may be any personnel using the system 100 for enrolling and/or assigning the NFC tag 106, without deviating from the scope of the disclosure. Examples of the user device 102 may include, but are not limited to, a desktop, a notebook, a laptop, a handheld computer, a touch sensitive device, a computing device, a smart-phone, and/or a smart watch. It will be apparent to a person of ordinary skill in the art that the user device 102 may include any device/apparatus that is capable of manipulation by the user. In the illustrated aspect of FIG. 1A, the user device 102 includes a user interface 112 and a processing unit 114.

The user interface 112 may include an input interface for receiving inputs from the user. Examples of the input interface may include, but are not limited to, a touch interface, a mouse, a keyboard, a motion recognition unit, a gesture recognition unit, a voice recognition unit, or the like. Aspects of the present disclosure are intended to include or otherwise cover any type of the input interface including known, related art, and/or later developed technologies. The user interface 112 may further include an output interface for displaying (or presenting) an output to the user. Examples of the output interface may include, but are not limited to, a display device, a printer, a projection device, and/or a speaker. Examples of the user interface 112 may include, but are not limited to, a digital display, an analog display, a touch screen display, a graphical user interface, a website, a webpage, a keyboard, a mouse, a light pen, an appearance of a desktop, and/or illuminated characters.

The processing unit 114 may include suitable logic, instructions, circuitry, interfaces, and/or codes for executing various operations, such as the operations associated with the user device 102, or the like. In some aspects, the processing unit 114 may be configured to control one or more operations executed by the user device 102 in response to an input received by way of the user interface 112 from the user. The processing unit 114 may be further configured to receive from the server 108, a set of tag data associated with each NFC tag of the plurality of NFC tags 102, when the user device 102 is commissioned (i.e., registered) with the system 100. Examples of the processing unit 114 may include, but are not limited to, an application-specific integrated circuit (ASIC) processor, a reduced instruction set computing (RISC) processor, a complex instruction set computing (CISC) processor, a field-programmable gate array (FPGA), a Programmable Logic Control unit (PLC), and the like. Aspects of the present disclosure are intended to include or otherwise cover any type of the processing unit 114 including known, related art, and/or later developed processing units.

The user device 102 further includes a memory 116 configured to store the logic, instructions, circuitry, interfaces, and/or codes of the processing unit 114, data associated with the user device 102, and data associated with the system 100. In an aspect, the memory 116 may be configured to store, in response to instructions from the processing unit 114, the set of tag data associated with each NFC tag of the plurality of NFC tags 102 in a Look Up Table (not shown). The set of tag data may comprise a mapping between a plurality of base keys associated with the plurality of NFC tags 102 with a plurality of Unique Serial Numbers associated with the plurality of NFC tags 102. Examples of the memory 116 may include, but are not limited to, a Read-Only Memory (ROM), a Random Access Memory (RAM), a flash memory, a removable storage drive, a hard disk drive (HDD), a solid-state memory, a magnetic storage drive, a Programmable Read Only Memory (PROM), an Erasable PROM (EPROM), and/or an Electrically EPROM (EEPROM). Aspects of the present disclosure are intended to include or otherwise cover any type of the memory 116 including known, related art, and/or later developed memories.

In some aspects, the user device 102 may further include one or more computer executable applications configured to be executed by the processing unit 114. The one or more computer executable applications may include suitable logic, instructions, and/or codes for executing various operations. The one or more computer executable applications may be stored in the memory 116. Examples of the one or more computer executable applications may include, but are not limited to, an audio application, a video application, a social media application, a navigation application, The one or more computer executable applications, as shown in FIG. 1A, includes a NFC enrollment application 118. One or more operations associated with the NFC enrollment application 118 may be controlled by the server 104.

The user device 102 may further include a communication interface 120. The communication interface 120 may be configured to enable the user device 102 to communicate with the server 108 and other components of the system 100 over the communication network 110, according to aspects of the present disclosure. Examples of the communication interface 120 may include, but are not limited to, a modem, a network interface such as an Ethernet card, a communication port, and/or a Personal Computer Memory Card International Association (PCMCIA) slot and card, an antenna, a radio frequency (RF) transceiver, one or more amplifiers, a tuner, one or more oscillators, a digital signal processor, a coder-decoder (CODEC) chipset, a subscriber identity module (SIM) card, and a local buffer circuit. It will be apparent to a person of ordinary skill in the art that the communication interface 120 may include any device and/or apparatus capable of providing wireless or wired communications between the user device 102 and the server 108.

The first through fourth access devices 104a-104d may be installed at first through fourth access points (not shown) of a facility such as, but not limited to, a building, a warehouse, and the like. Aspects of the present disclosure are intended to include or otherwise cover any type of the facility. In an aspect, the first through fourth access devices 104a-104d may be wirelessly coupled to one another. Further, the first through fourth access devices 104a-104d may form a mesh group where messages from the processing circuitry 126 of the server 108 may be broadcasted to nearby access devices and then in turn forwarded to further nearby access devices of the plurality of access devices 104. Such a configuration enables a limitless extension of range of operation given that there are access devices of the plurality of access devices 104 within a 50 meters range of each other. Additionally, such a configuration facilitates to dramatically save wiring and routing involved during installation of the system 100.

In an aspect, the first through fourth access devices 104a-104d may be configured as local hosts where an access decision (e.g., granting access to a NFC tag) is decided by an access device of the plurality of access devices 104 using user credential information pertaining to each user stored in the access device. This allows for instant access response times since the decision is taken locally. The user credential information stored in the access device may be secured during updating by the mesh encryption standard and during access request by encryption keys defined by the access control application running on the access device, the NFC tag of the plurality of NFC tags 106, the user device 102, and so forth.

In an aspect, the system 100 may be further configured to improve an access response speed even further after a first access is done on the access device by a user. In an aspect, after the first access is granted on an access device of the plurality of access devices 104, a NFC tag of the plurality of NFC tags 106 and/or the user device 102 is configured to store an additional information pertaining to a location of the user credential information in real time. In other words, an additional information pertaining to location of the credentials of the user may be written to the access device in real time on the first access try, so that when next time the user tries to access that access device, the access device may read this location information in addition to a unique user identifier and grant access response speeds faster than before.

In an aspect, each access device of the plurality of access devices 104 may have a specific location in its memory for each user which is maintained by server 108 whenever permission is granted to a new user to an access barrier by way of the access device. Hence, the same user can have different location allotted to him in memory for each of the access devices. Every reader's memory storage space map may be handled by the server 108 procedure and may also have virtual memory maps replicated pertaining to each access device saved in the server 108. These virtual maps may directly indicate the storage utilization and user information for every access device and allow remote monitoring and changes in real time.

As illustrated in FIG. 1A, the first through fourth access devices 104a-104d may represent distributed nodes of a wireless mesh network. As the first through fourth access devices 104a-104d are located at the distributed nodes of the wireless mesh network, therefore communication between the first through fourth access devices 104a-104d can be interchangeably referred to as communication between first through fourth nodes in the wireless mesh network. It will be apparent to a person skilled in the art that the plurality of access devices 104 is shown to include four access devices (i.e., the first through fourth access devices 104a-104d) to make the illustrations concise and clear and should not be considered as a limitation of the present disclosure. In various other aspects, the plurality of access devices 104 can include any number of access devices, without deviating from the scope of the present disclosure. The first through fourth access devices 104a-104d may include, but is not limited to, a Near Field Communication (NFC) reader, a biometric reader, and the like. As illustrated in FIG. 1A, the first through fourth access devices 104a-104d may include a Near Field Communication (NFC) scanner. It will be apparent to a person skilled in the art that the first through fourth access devices 104a-104d can include any type of access devices, without deviating from the scope of the present disclosure. The first through fourth access devices 104a-104d may comprise first through fourth device memories 122a-122d and first through fourth device processing units 124a-124d. Specifically, the first access device 104a may comprise the first device memory 122a and the first device processing unit 124a, the second access device 104b may comprise the second device memory 122b and the second device processing unit 124b, the third access device 104c may comprise the third device memory 122c and the third device processing unit 124c, and the fourth access device 104d may comprise the fourth device memory 122d and the fourth device processing unit 124d.

The first through fourth memories 122a-122d may include suitable logic, instructions, circuitry, interfaces, and/or codes to store data associated with the NFC tag 106 and data associated with the first through fourth access devices 104a-104d. The first through fourth memories 122a-122d may be configured to store user credential information derived from the unique user identifier (ID) associated with each user registered to an access device (e.g., the first through fourth access devices 106).

Examples of the first through fourth memories 122a-122d may include but are not limited to, a ROM, a RAM, a flash memory, a removable storage drive, a HDD, a solid-state memory, a magnetic storage drive, a PROM, an EPROM, and/or an EEPROM. Aspects of the present disclosure are intended to include or otherwise cover any type of the first through fourth memories 122a-122d, including known, related art, and/or later developed technologies.

The first through fourth device processing units 124a-124d may include suitable logic, instructions, circuitry, interfaces, and/or codes for executing various operations, such as the operations associated with the first through fourth access devices 104a-104d, or the like. In some aspects, the first through fourth device processing units 124a-124d may be configured to control one or more operations performed by the first through fourth access devices 104a-104d in response to an input received from the server 108. For example, the first through fourth access devices 104a-104d may be configured to receive the set of tag data associated with the plurality of NFC tags 106 from the server 108 when the first through fourth access devices 104a-104d are commissioned (i.e., registered) with the system 100. Examples of the first through fourth device processing units 124a-124d may include, but are not limited to, an application-specific integrated circuit (ASIC) processor, a reduced instruction set computing (RISC) processor, a complex instruction set computing (CISC) processor, a field-programmable gate array (FPGA), a Programmable Logic Control unit (PLC), and the like. Aspects of the present disclosure are intended to include or otherwise cover any type of the first through fourth device processing units 124a-124d including known, related art, and/or later developed technologies.

The plurality of NFC tags 106 may be configured to utilize a Radio-frequency identification (NFC) technique to authorization and/or to provide credential data. Each NFC tag of the plurality of NFC tags 106 may comprise an integrated chip (IC) having a tag memory (not shown) and operating circuitry (not shown), that may be further connected to an antenna (not shown). Each NFC tag of the plurality of NFC tags 106 may be configured to act as a transponder to provide information stored in the tag memory in response to a radio frequency (RF) interrogation signal received from an access device of the first through fourth access devices 104a-104d. In an aspect, each NFC tag of the plurality of NFC tags 106 may include, but not limited to, a passive NFC tag, an active NFC tag, and the like. It will be apparent to a person skilled in the art that the system 100 is shown to include one NFC tag to make the illustrations concise and clear and should not be considered as a limitation of the present disclosure. In various other aspects, the system 100 can include more than one NFC tags, without deviating from the scope of the present disclosure. The plurality of NFC tags 106 may be configured to enable a user to access a restricted area. Further, the plurality of NFC tags 106 may comprise a plurality of associated base keys and a plurality of associated unique serial numbers. Each NFC tag of the plurality of NFC tags 106 may have an associated credential identifier (CID). The CID may represent credentials of a user associated to the NFC tag 106 that may be stored within the NFC tag 106 when the NFC tag 106 is registered with the system 100.

In some aspects of the present disclosure, the user device 102 may have an associated CID. The CID of the NFC tags 106 and the user device 102 may be similar that may be stored within the NFC tag 106 and the user device 102 when the NFC tag 106 and the user device 102 is registered with the system 100. It will be apparent to a person of ordinary skill in the art, that the CID may be associated to all devices (e.g., the user device 102, the NFC tags 106, and the like) by way of which the user tries to access the restricted area through the first through fourth access devices 104a-104d, without deviating from the scope of the present disclosure.

The server 108 may be a network of computers, a software framework, or a combination thereof, that may provide a generalized approach to create the server implementation. The server 108 may be configured to store a mapping between a plurality of base keys and a plurality of unique serial numbers associated with the plurality of NFC tags 106. Further, the server 108 may be configured to provide the plurality of base keys to each access device (e.g., the first through fourth access devices 104a-104d) of the plurality of access devices 104 when each access device (e.g., the first through fourth access devices 104a-104d) of the plurality of access devices 104 is registered with the system 100. The server 108 may be further configured to facilitate to grant access to each NFC tag of the plurality of NFC tags 106 based on an authentication of a base key of the plurality of base keys associated with the NFC tag of the plurality of NFC tags 106. Examples of the server 108 may include, but are not limited to, personal computers, laptops, mini-computers, mainframe computers, any non-transient and tangible machine that can execute a machine-readable code, cloud-based servers, distributed server networks, or a network of computer systems. The server 108 may be realized through various web-based technologies such as, but not limited to, a Java web-framework, a .NET framework, a personal home page (PHP) framework, or any web-application framework. The server 108 may be maintained by a storage facility management authority or a third-party entity that facilitates service enablement and resource allocation operations of the system 100. The server 108 may include processing circuitry 126 and a database 128.

The processing circuitry 126 may include suitable logic, instructions, circuitry, interfaces, and/or codes for executing various operations, such as, but not limited to, enrollment and assignment of the NFC tag 106 by way of the user device 102 and/or the first through fourth access devices 104a-104d. The processing circuitry 126 may be configured to host and enable the NFC enrollment application 118 running on (or installed on) the user device 102 to perform one or more operations associated with the system 100 by communicating one or more commands and/or instructions over the communication network 110. Examples of the processing circuitry 126 may include, but are not limited to, an ASIC processor, a RISC processor, a CISC processor, a FPGA, and the like.

The database 128 may be configured to store the logic, instructions, circuitry, interfaces, and/or codes of the processing circuitry 126 for executing various operations. Further, the database 128 may be configured for storage and retrieval of data associated with the system 100. The database 128 may be further configured to store therein, credentials associated with the NFC tag 106 enrolled with the system and users registered with the system 100. Examples of the database 128 may include but are not limited to, a centralized database, a distributed database, a relational database, a NoSQL database, a cloud database, an object-oriented database, a hierarchical database, a network database, and the like. In some aspects, a set of centralized or distributed network of peripheral memory devices may be interfaced with the server 104, as an example, on a cloud server. Aspects of the present disclosure are intended to include or otherwise cover any type of the database 128 including known, related art, and/or later developed technologies.

The communication network 110 may include suitable logic, circuitry, and interfaces that may be configured to provide a plurality of network ports and a plurality of communication channels for transmission and reception of data related to operations of various entities (such as the user device 102, the first through fourth access devices 104a-104d, the NFC tag 106, and the server 108) of the system 100. Each network port may correspond to a virtual address (or a physical machine address) for transmission and reception of the communication data. For example, the virtual address may be an Internet Protocol Version 4 (IPV4) (or an IPV6 address) and the physical address may be a Media Access Control (MAC) address. The communication network 110 may be associated with an application layer for implementation of communication protocols based on one or more communication requests from the user device 102, the first through fourth access devices 104a-104d, the NFC tag 106, and the server 108. Communication data may be transmitted or received, via the communication protocols. Examples of the communication protocols may include, but are not limited to, Hypertext Transfer Protocol (HTTP), File Transfer Protocol (FTP), Simple Mail Transfer Protocol (SMTP), Domain Network System (DNS) protocol, Common Management Interface Protocol (CMIP), Transmission Control Protocol and Internet Protocol (TCP/IP), User Datagram Protocol (UDP), Long Term Evolution (LTE) communication protocols, or any combination thereof.

In one aspect, the communication data may be transmitted or received via at least one communication channel of a plurality of communication channels in the communication network 110. The communication channels may include a wireless channel. The wireless channel may be associated with a data standard which may be defined by one of a Wireless Local Area Network (WLAN), a Wireless Sensor Network (WSN), Wireless Area Network (WAN), Wireless Wide Area Network (WWAN), the Internet, an infrared (IR) network, a radio frequency (RF) network, and a combination thereof. In a preferred aspect of the present disclosure, the communication channel may be selected from at least one of, a Bluetooth Low Energy (BLE) mesh network, a Zigbee network, a thread, and the like. Aspects of the present disclosure are intended to include or otherwise cover any type of communication channels, including known, related art, and/or later developed technologies.

Figure 2:
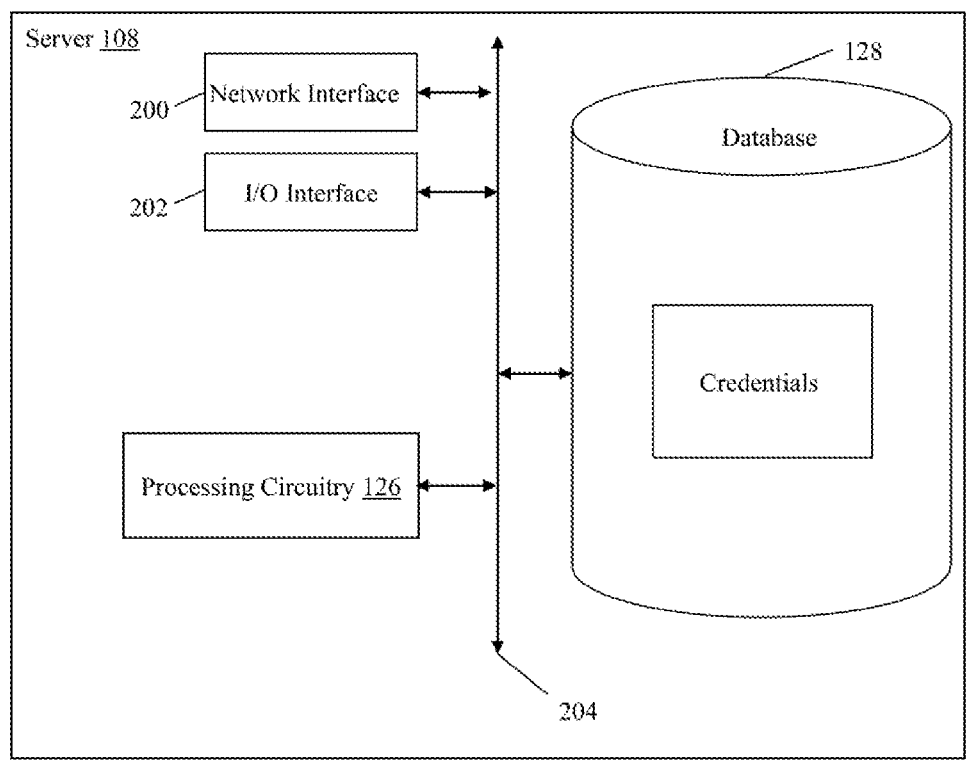
FIG. 2 is a block diagram that illustrates the server of FIG. 1A, in accordance with an exemplary aspect of the present disclosure.

FIG. 2 is a block diagram that illustrates the server 108 of FIG. 1A, in accordance with an exemplary aspect of the present disclosure. The server 108 may include the processing circuitry 126 and the database 128. The server 108 may further include a network interface 200 and an input/output (I/O) interface 202. The processing circuitry 126, the database 128, the network interface 200, and the input/output (I/O) interface 202 may communicate with each other by way of a first communication bus 204. It will be apparent to a person having ordinary skill in the art that the server 108 is for illustrative purposes and not limited to any specific combination of hardware circuitry and/or software.

The database 128 may be configured to store the credentials associated with the plurality of NFC tags 106 enrolled with the system 100. The network interface 200 may include suitable logic, circuitry, and interfaces that may be configured to establish and enable a communication between the server 108 and different components of the system 100, via the communication network 110. The network interface 200 may be implemented by use of various known technologies to support wired or wireless communication of the server 108 with the communication network 110. The network interface 200 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and a local buffer circuit.

The processing circuitry 126 may be configured to perform the enrolment and assignment operations associated with the system 100. The processing circuitry 126 may be configured to enable the user to enroll a NFC tag of the plurality of NFC tags 106 with the system 100 by way of the user device 102. In other words, each NFC tag of the plurality of NFC tags 106 may be enrolled with the system 100 by way of enrolment at the user device 102. In another aspect, the processing circuitry 126 may be configured to enable the user to enroll the NFC tag of the plurality of NFC tags 106 with the system 100 by way of the first through fourth access devices 104a-104d. In other words, each NFC tag of the plurality of NFC tags 106 is enrolled with the system 100 by way of enrolment at an access device of the plurality of access devices 104. The processing circuitry 126 may be configured to enable the user device 102 to use the set of tag data associated with the NFC tag 106 to enroll the NFC tag 106. In other words, each NFC tag of the plurality of NFC tags 106 may be enrolled with the CID. The CID associated with each NFC tag of the plurality of NFC tags 106 may be further encoded with a unique encryption key such that the unique encryption key associated with each NFC tag of the plurality of NFC tags 106 is written to each NFC tag of the plurality of NFC tags 106. In an aspect, the first through fourth access devices 104a-104d may be further configured to store the CID associated with each NFC tag of the plurality of NFC tags 106 in the first through fourth memories 122a-122d when each NFC tag of the plurality of NFC tags 106 is enrolled (i.e., registered and permissions are assigned) with the system 100. Further, the first through fourth access devices 104a-104d may be further configured to transmit the CID associated with each NFC tag of the plurality of NFC tags 106 to the server 108 over the communication network 110 such that the CID associated with each NFC tag of the plurality of NFC tags 106 is stored in the database 128.

In an aspect, when the processing circuitry 126 receives an enrolment request from one of, the user device 102 and the first through fourth access devices 104a-104d, the processing circuitry 126 may enable the user device 102 and the first through fourth access devices 104a-104d to extract the base key of the NFC tag 106 to read and/or write the NFC tag of the plurality of NFC tags 106. In an aspect, to read the CID associated with each NFC tag of the plurality of NFC tags 106, each access device of the plurality of access devices 104 may be configured to utilizes a key diversification technique that involves matching the base key and a unique serial number associated with each NFC tag of the plurality of NFC tags 106. In another aspect, to read the CID associated with each NFC tag of the plurality of NFC tags 106, the user device 102 may be configured to utilizes the key diversification technique that involves matching the base key and the unique serial number associated with each NFC tag of the plurality of NFC tags 106. For example, the user device 102 may be configured to match the base key of the NFC tag 106 with each base key of the plurality of base keys associated with the plurality of NFC tags stored in the memory 116. In response to a match of the base key of the NFC tag 106 with one of the plurality of base keys, the processing unit 114 of the user device 102 may be configured to display a credential input menu (not shown) of the NFC enrolment application 118 through the user interface 112. In an aspect, the credential input menu may be provided to receive credentials associated with the user to be linked with the NFC tag 106 and credentials associated with permissions assigned to the NFC tag 106. The processing unit 112 may be further configured to store the credentials associated with the user to be linked with the NFC tag 106 and the credentials associated with permissions assigned to the NFC tag 106 in the memory 116.

Figure 1B:
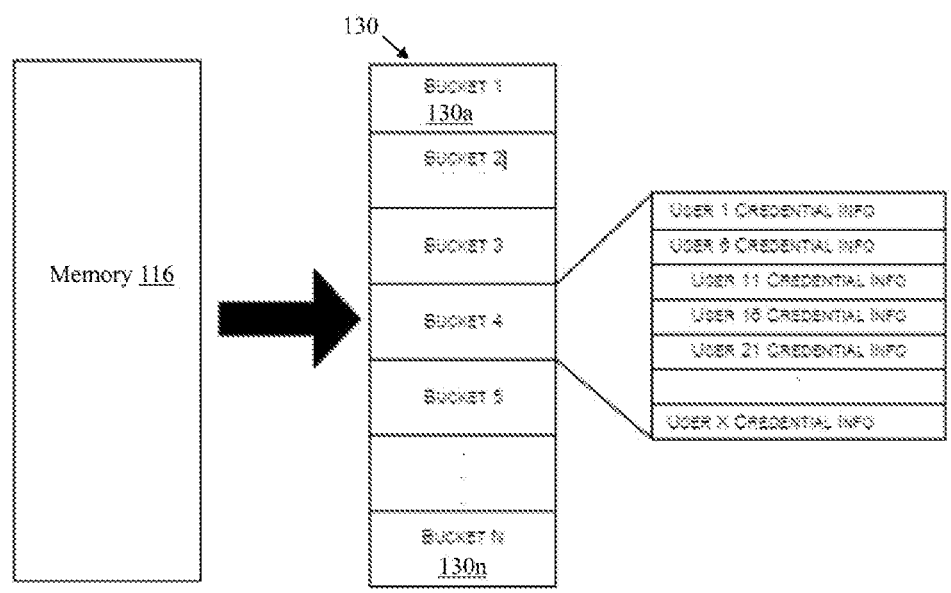
FIG. 1B illustrates an exemplary storage in a memory of a user device, in accordance with an aspect of the present disclosure.

Referring to FIG. 1B that illustrates an exemplary storage in the memory 116 of the user device 102, in accordance with an aspect of the present disclosure. As illustrated, the storage in the memory 116 may be divided into fixed number of buckets 130 of which first through fourth buckets 130a-130n are shown. The buckets first through fourth buckets 130a-130n may be configured to store the credentials associated with the user to be linked with the NFC tag 106 and the credentials associated with permissions assigned to the NFC tag 106. Further, a size of the first through fourth buckets 130a-130n may be determined by a read buffer size of the processing unit 114 that may be configured to read from the memory 116.

In an aspect, every new user credential information shown as 130a-130n may be assigned to a different bucket of the first through fourth buckets 130a-130n and derived from a unique user identifier (ID) associated with the credentials. The read buffer may dictate how many maximum bytes of data can be read from the memory 116 per read cycle. The unique user ID may be generated when a new user is added to the system 100. At the time of access request from the user device 102, the unique user ID may aid in determining which bucket the user data is present in. In other words, the unique user ID may facilitate to determine a bucket associated to the memory of the access device of the plurality of access devices 104 where the user credential information is stored. If a bucket of the first through fourth buckets 130a-130n gets full by the user data, another bucket of the first through fourth buckets 130a-130n can be daisy chained to the full bucket by storing a location information of a succeeding bucket in the full bucket. In such case, an access response is enhanced when large number of user information is stored and to be retrieved from the memory 116.

Referring to FIG. 1A, the processing unit 114 may be further configured to encrypt the credential ID using a unique encryption key. The unique encryption key may be generated using the base key of the NFC tag 106 and a unique serial number associated with the NFC tag 106. In such scenario, each NFC tag registered with the system 100 may have an associated unique encryption key. The processing unit 114 may be further configured to transmit the generated unique encryption key to the NFC tag 106 by way of the communication network 110 such that the unique encryption key is written to the NFC tag 106 (i.e., stored in the memory of the NFC tag 106). In an aspect, the processing unit 114 may be further configured to transmit the credential ID to the server 108 by way of the communication network 110. The processing circuitry 126 of the server 108 may be configured to receive the credential ID associated with the NFC tag 106 and further store the credential ID in the database 128.

Similarly, the NFC tag 106 may be registered with the system 100 using the first through fourth access devices 104a-104d. The first through fourth access devices 104a-104d may be configured to match the base key of the NFC tag 106 with each base key of the plurality of base keys associated with the plurality of NFC tags stored in the memory 116. In response to a match of the base key of the NFC tag 106 with one of the plurality of base keys, the first through fourth device processing units 122a-122d of the first through fourth access devices 104a-104d may be configured to display a credential input menu (not shown) through a user interface (not shown) of the first through fourth access devices 104a-104d. In an aspect, the credential input menu may be provided to receive credentials associated with the user to be linked with the NFC tag 106 and credentials associated with permissions assigned to the NFC tag 106. The first through fourth device processing units 122a-122d may be further configured to store the credentials associated with the user to be linked with the NFC tag 106 and the credentials associated with permissions assigned to the NFC tag 106 in the first through fourth device memories 124a-124d. It will be apparent to those skilled in the art that the credentials associated with the user to be linked with the NFC tag 106 and the credentials associated with permissions assigned to the NFC tag 106 may be stored in the first through fourth device memories 124a-124d in a manner similar to the storage of the credentials associated with the user to be linked with the NFC tag 106 and the credentials associated with permissions assigned to the NFC tag 106 in the memory 116, without deviating from the scope of the present disclosure.

Further the first through fourth device processing units 122a-122d may be configured to encrypt the credential ID using a unique encryption key. The unique encryption key may be generated using the base key of the NFC tag 106 and a unique serial number associated with the NFC tag 106. In such scenario, each NFC tag registered with the system 100 may have an associated unique encryption key. The first through fourth device processing units 122a-122d may be further configured to transmit the generated unique encryption key to the NFC tag 106 by way of the communication network 110 such that the unique encryption key is written to the NFC tag 106 (i.e., stored in the memory of the NFC tag 106). In an aspect, the first through fourth device processing units 122a-122d may be further configured to transmit the credential ID to the server 108 by way of the communication network 110. The processing circuitry 126 of the server 108 may be configured to receive the credential ID associated with the NFC tag 106 and further store the credential ID in the database 128.

In an example, to access a restricted area where the first access device 104a is installed, a user may bring the NFC tag 106 registered with the system 100 in a predefined proximity range of the first access device 104a such that the NFC tag 106 is in a network range of the first access device 104a. In such scenario, the NFC tag 106 may receive an interrogation signal from the first access device 104a, and in response to the interrogation signal, the NFC tag 106 may provide an access signal to the first device processing unit 122a of the first access device 104a. The access signal may comprise the base key associated with the NFC tag 106 and the unique serial number associated with the NFC tag 106. Further, in response to the access signal, the first device processing unit 122a of the first access device 104a may be configured to fetch and match the stored CID of each NFC of the plurality of NFC tags 106 to grant access to the user with the NFC tag having matching CID. In other words, the first device processing unit 122a of the first access device 104a may be configured to use a key diversification technique to decrypt the unique encryption key associated with the NFC tag 106 to extract the credential ID. In an aspect, the first device processing unit 122a may be configured to match the base key of the NFC tag 106 with each base key of the plurality of base keys associated with the plurality of NFC tags stored in the first device memory 124a. In an aspect, the predefined proximity range is from 1 meter to 100 meters. Further, when the first device processing unit 122a determines a match between the base key of the NFC tag 106 and one of the base keys of the of the plurality of base keys, the first device processing unit 122a may be configured to identify the NFC tag 106 based on the unique serial number stored corresponding to the matched base key in the first device memory 124a. Further, the first device processing unit 122a may be configured to generate an authentication signal based on a successful identification of the NFC tag 106. In an aspect, the first device processing unit 122a may be further configured to transmit the authentication signal to a corresponding actuator (not shown) such that the actuator is activated, and access is granted to the user having the NFC tag 106. In one aspect, the access may be granted to the user having the NFC tag 106 based on an identification and fetching of the user credential information from a memory of an access device e.g., the first through fourth access devices 104a-104d) based on the unique user identifier and the authentication of the base key of the plurality of base keys associated with the NFC tag 106. The fetching of the user credential information from the memory of the access device may facilitate to determine if permissions are present for the associated NFC tag. Upon determining that the permissions are present an access is granted to the NFC tag. Further, the first device processing unit 122a may be configured to transmit the authentication signal to the server 108 such that the processing circuitry 126 updates a log associated with the NFC tag 106 in the database 128 that may depict usage of the NFC tag 106 within the premises.

For the sake of the foregoing discussion, it is assumed that the NFC tag 106 is authenticated for access at the first access device 104a, however, it should not be considered a limitation of the present disclosure. It will be apparent to a person skilled in the art that other access devices (i.e., the second through fourth access devices 104b-104d) can also be used to authenticate the NFC tag 106 for granting access in a restricted area protected by the corresponding access device, in a manner similar to as discussed above in conjunction with the first access device 104a.

Figure 3:
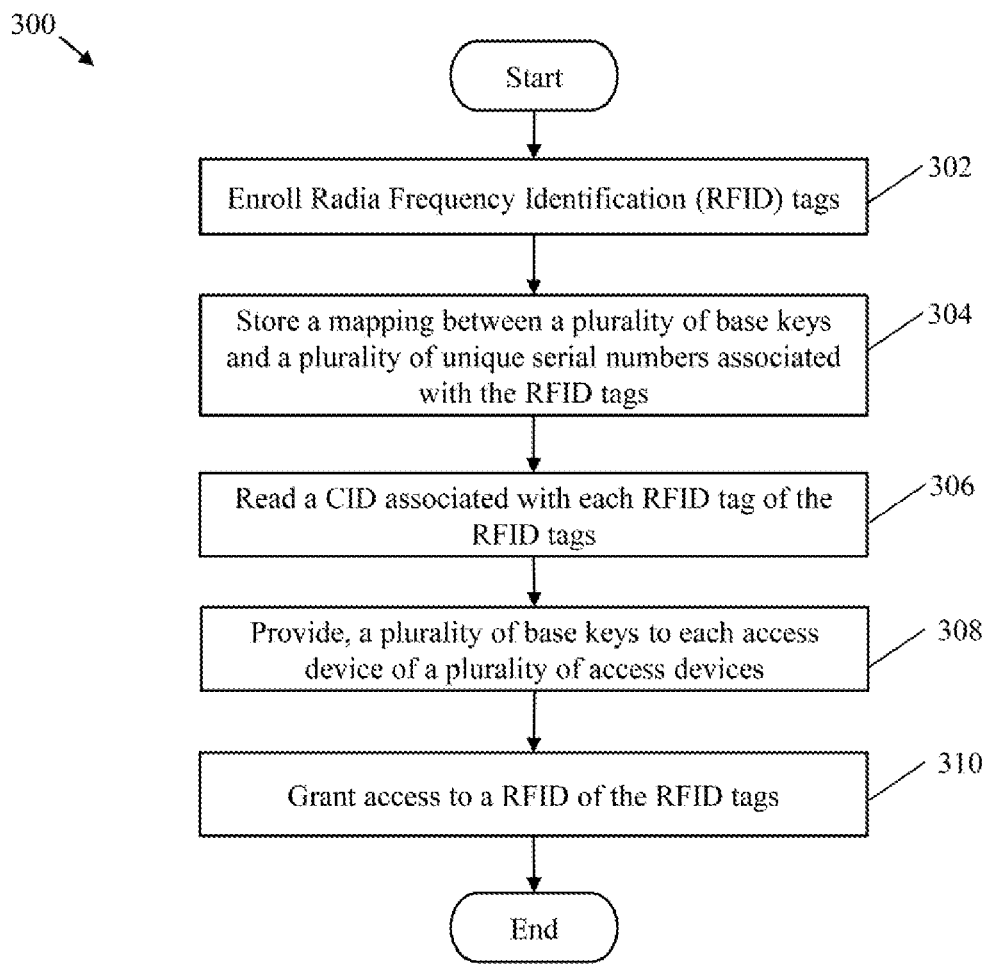
FIG. 3 represent a flow chart that illustrates a method (i.e., a process) for storing and validating credentials using the system, in accordance with an exemplary aspect of the present disclosure.

FIG. 3 represent a flow chart that illustrates a method 300 (i.e., a process) for storing and validating credentials using the system 100, in accordance with an exemplary aspect of the present disclosure. Referring now to FIG. 3, the method 300 may generally start at step 302, where the user device 102 and/or an access device of the plurality of access devices 106 may enrol each NFC tag of the plurality of NFC tags 106 by using the credential ID (CID).

At step 304, the server 108 may store a mapping between the plurality of base keys and the plurality of unique serial numbers associated with the plurality of NFC tags 106.

At step 306, the user device 102 and/or the access device of the plurality of access devices 106 may read the CID associated with each NFC tag of the plurality of NFC tags 106. Further, the user device 102 and/or the access device of the plurality of access devices 106 is configured to utilizes a key diversification technique that involves matching the base key and a unique serial number associated with each NFC tag of the plurality of NFC tags 106.

At step 308, the server 108 may provide, the plurality of base keys to each access device of the plurality of access devices 104 when each access device of the plurality of access devices 104 is registered with the system 100, At step 310, the server 108 may grant an access to a NFC tag of the plurality of NFC tags 106 based on an authentication of a base key of the plurality of base keys associated with the NFC tag of the plurality of NFC tags 106.

In an aspect, the proposed system and method stores and updates the credentials on an access device in a credential-based access control system for efficient memory utilization and rapid access response speeds for a large user database using wireless mesh networks such as Bluetooth Low Energy Mesh, Zigbee, and thread.

In another aspect, the proposed system and method employs a wireless mesh network that consists of a plurality of access devices 104, the server 108 and the user device 102 which facilitate to allow user access to a restricted area.

Furthermore, the system and method facilitate to store the access credential database on the database 128 and transfer data packet to the access device of the plurality of access devices 104 when it powers on for the first time.

In another aspect, each access devices of the plurality of access devices 104 holds the credentials and makes the access decision upon receiving an access request from the user device associated with the user.

In another aspect, the system and method provide a unique identifier to the access device to help make an access decision and enables notifying any changes in the credentials from the server 108 to the access device of the plurality of access devices 104 in real time.

In another aspect, user data on the access device of the plurality of access devices 104 is modified on its first access on a reader to allow faster access response time on further access requests.

In another aspect, the system employs a wireless mesh network consisting of the plurality of access devices 104, the server 108 and the user device 102. The system allows credentials to be stored in the access device of the plurality of access devices 104 using a method which allows rapid access grant speeds while optimizing storage space.

As will be readily apparent to those skilled in the art, the present aspects may easily be produced in other specific forms without departing from its essential characteristics. The present aspects are, therefore, to be considered as merely illustrative and not restrictive, the scope being indicated by the claims rather than the foregoing description, and all changes which come within therefore intended to be embraced therein.

What is claimed is:

1. A system (100) for storing and validating credentials, the system (100) comprising:

a plurality of access devices (104) wirelessly coupled to one another by way of a wireless mesh network, wherein each access device of the plurality of access devices (104) comprises a memory of a plurality of memories (122) such that each access device of the plurality of access devices (104) is configured to store in the associated memory, user credential information derived from a unique user identifier that is associated with each user registered to the corresponding access device;

a plurality of NFC tags (106), wherein each NFC tag of the plurality of NFC tags (106) enables a user of a plurality of users to access a restricted area, wherein:
  (i) the plurality of NFC tags (106) has a plurality of base keys, a plurality of unique serial numbers, and the user credential information of the associated plurality of users, and
  (ii) each NFC tag of the plurality of NFC tags (106) is enrolled with the system (100) by way of enrolment at an access device of the plurality of access devices (104);

a server (108) coupled to the plurality of access devices (104), and configured to:
  store a mapping between the plurality of base keys and the plurality of unique serial numbers associated with the plurality of Near Field Communication (NFC) tags (106); and
  provide the plurality of base keys to the access device of the plurality of access devices (104) when the access device is registered with the system (100), wherein an access is granted to a NFC tag of the plurality of NFC tags (106) based on (i) an authentication of a base key of the NFC tag by matching the base key of the NFC tag with the plurality of base keys stored in the access device and (ii) matching the user credential information associated with the NFC tag with the user credential information of registered users with the access device stored in the memory of the access device.

2. The system (100) as claimed in claim 1, wherein the unique user identifier facilitates to determine a bucket associated to the memory of the access device of the plurality of access devices (104) where the user credential information is stored.

3. The system (100) as claimed in claim 2, wherein the user credential information facilitates to determine whether permissions for the NFC tag is present in the memory of the access device of the plurality of access devices (104) to grant access.

4. The system (100) as claimed in claim 1, further comprising a user device (102) such that each NFC tag of the plurality of NFC tags (106) is enrolled with the system (100) by way of enrolment at the user device (102).

5. The system (100) as claimed in claim 1, wherein each NFC tag of the plurality of NFC tags (106) is enrolled with a credential ID (CID), wherein the credential ID associated with each NFC tag of the plurality of NFC tags (106) is encoded with a unique encryption key such that the unique encryption key associated with each NFC tag of the plurality of NFC tags (106) is written to each NFC tag of the plurality of NFC tags (106).

6. The system (100) as claimed in claim 1, wherein, to read the credential ID associated with each NFC tag of the plurality of NFC tags (106), each access device of the plurality of access devices (104) is configured to utilize a key diversification technique that involves matching the base key and a unique serial number associated with each NFC tag of the plurality of NFC tags (106).

7. The system (100) as claimed in claim 1, wherein the user device (102) is further configured to fetch the base key associated with the NFC tag of the plurality of NFC tags (106) from the server (108) to read and/or write the NFC tag of the plurality of NFC tags (106).

8. The system (100) as claimed in claim 5, wherein, to read the credential ID associated with each NFC tag of the plurality of NFC tags (106), the user device (102) is configured to utilizes a key diversification technique that involves matching the base key and the unique serial number associated with each NFC tag of the plurality of NFC tags (106).

9. The system (100) as claimed in claim 5, wherein each access device of the plurality of access devices (104) is further configured to store the CID associated with each NFC tag of the plurality of NFC tags (106) when each NFC tag of the plurality of NFC tags (106) is enrolled with the system (100).

10. The system (100) as claimed in claim 5, wherein each access device of the plurality of access devices (104) is further configured to transmit the credential ID (CID) associated with each NFC tag of the plurality of NFC tags (106) to the server (108) over the communication network (110).

11. The system (100) as claimed in claim 1, wherein each access device of the plurality of access devices (104) is further configured to fetch and match the stored credential ID of each NFC tag of the plurality of NFC tags (106) when the NFC tag registered with the system (100) is within a predefined proximity range to grant access to the user with the NFC tag having matching credential CID.

12. The system (100) as claimed in claim 11, wherein the predefined proximity range is from 1 meter to 100 meters.

13. The system (100) as claimed in claim 1, wherein the plurality of access devices (104) forms a mesh group such that messages are broadcasted to nearby access device of the plurality of access devices (104) that further forwards the messages to the nearby access devices of the plurality of access devices (104) by way of a Bluetooth Low Energy (BLE) signal by using a beacon.

14. The system (100) as claimed in claim 1, wherein after a first access is granted on an access device of the plurality of access devices (104), a NFC tag of the plurality of NFC tags (106) and/or the user device (102) is configured to store an additional information pertaining to a location of the user credential information in real time.

15. The system (100) as claimed in claim 1, wherein the user device (102) is configured to be enrolled with the system (100) by way of a credential ID (CID).

16. A method (300) for storing and validating credentials, the method comprising:
    forming a wireless mesh network by a plurality of access devices (104) wirelessly coupled to one another;
    enrolling, by way of, an access device of a plurality of access devices (106), each Near Field Communication (NFC) tag of a plurality of NFC tags (106) by using a credential ID (CID);
    enabling, by way of each NFC tag of the plurality of NFC tags, a user of a plurality of users to access a restricted area, wherein the plurality of NFC tags (106) has a plurality of associated base keys, a plurality of associated unique serial numbers, and user credential information of the associated plurality of users;
    storing, by a memory of a plurality of memories associated with an access device of the plurality of access devices (104), user credential information derived from a unique user identifier associated with each user registered to the corresponding access device;
    storing, by a server (108) coupled to the plurality of access devices (104), a mapping between the plurality of base keys and the plurality of unique serial numbers associated with the plurality of NFC tags (106);
    reading, by the access device of the plurality of access devices (104), the credential CID associated with each NFC tag of the plurality of NFC tags (106), wherein each access device of the plurality of access devices (104) is configured to utilizes a key diversification technique that involves matching a base key and a unique serial number associated with each NFC tag of the plurality of NFC tags (106);
    providing, by the server (108), the plurality of base keys to an access device of the plurality of access devices (104) when the access device (104)-is registered with the system (100), wherein an access is granted to an NFC tag of the plurality of NFC tags (106) based on (i) an authentication of a base key of the NFC tag by matching the base key of the NFC tag with the plurality of base keys stored in the access device and (ii) matching the user credential information associated with the NFC tag with the user credential information of registered users with the access device stored in the memory of the access device.

17. The method (300) as claimed in claim 16, further comprising facilitating, by way of the unique user identifier, to determine a bucket associated to the memory of the access device of the plurality of access devices (104) where the user credential information is stored.

18. The method (300) as claimed in claim 16, further comprising facilitating to determine wherein the user credential information facilitates to determine whether permissions for the NFC tag is present in the memory of the access device of the plurality of access devices (104) to grant access.

19. The method (300) as claimed in claim 16, further comprising enrolling each NFC tag of the plurality of NFC tags (106) by way of enrolment at a user device (102).

* * * * *